US010955377B2

(12) United States Patent
Westmarland et al.

(10) Patent No.: US 10,955,377 B2
(45) Date of Patent: Mar. 23, 2021

(54) GAS SENSORS WITH STRUCTURE TO RESIST SIGNAL LOSSES DUE TO CONDENSATION

(71) Applicant: Life Safety Distribution AG, Hegnau (CH)

(72) Inventors: Paul Christopher Westmarland, Surrey (GB); Martin Jonathan Kelly, Hampshire (GB); John Chapples, Hampshire (GB); Neils Richard Stewart Hansen, Dorset (GB)

(73) Assignee: LIFE SAFETY DISTRIBUTION AG, Hegnau (CH)

( * ) Notice: Subject to any disclaimer, the term of this patent is extended or adjusted under 35 U.S.C. 154(b) by 411 days.

(21) Appl. No.: 15/118,692

(22) PCT Filed: Feb. 10, 2015

(86) PCT No.: PCT/US2015/015140
§ 371 (c)(1),
(2) Date: Aug. 12, 2016

(87) PCT Pub. No.: WO2015/123176
PCT Pub. Date: Aug. 20, 2015

(65) Prior Publication Data
US 2017/0052145 A1    Feb. 23, 2017

Related U.S. Application Data

(60) Provisional application No. 61/938,937, filed on Feb. 12, 2014.

(51) Int. Cl.
*G01N 27/407* (2006.01)
*G01N 27/28* (2006.01)

(52) U.S. Cl.
CPC ......... *G01N 27/4077* (2013.01); *G01N 27/28* (2013.01); *G01N 27/407* (2013.01)

(58) Field of Classification Search
CPC .................................................. G01N 27/4077
See application file for complete search history.

(56) References Cited

U.S. PATENT DOCUMENTS 3,450,619 A    6/1969  Kruse et al.
4,132,616 A *  1/1979  Tantram ............ G01N 33/0011
                                            204/400

(Continued)

FOREIGN PATENT DOCUMENTS

CN       1673728 A      9/2005
CN      101171510 A     4/2008

(Continued)

OTHER PUBLICATIONS

Machine translation of CN-102636542-A; accessed and printed Nov. 5, 2020 (Year: 2012).*
Europe Patent Application No. 15707830.4, Communication pursuant to Article 94(3) EPC, dated Dec. 15, 2017, 5 pages.
PCT Application No. PCT/US2015/015140, International Search Report, dated May 6, 2015, 4 pages.

(Continued)

*Primary Examiner* — Edward J. Schmiedel
(74) *Attorney, Agent, or Firm* — Alston & Bird LLP

(57) ABSTRACT

Embodiments of the disclosure relate to capillary controlled gas sensors comprising a top cap assembly, wherein the top cap assembly is operable to reduce the effects of condensation and pressure changes on the effectiveness of the gas sensor. The top cap assembly comprises a capillary controlled gas flow path, a bulk flow control assembly, and a raised boss surrounded by a moat.

27 Claims, 7 Drawing Sheets

(56) References Cited

U.S. PATENT DOCUMENTS

| | | | | |
|---|---|---|---|---|
| 4,324,632 | A | * 4/1982 | Tantram | G01N 33/0011 |
| | | | | 204/415 |
| 6,129,825 | A | 10/2000 | Mallory et al. | |
| 2003/0136675 | A1 | * 7/2003 | Ishikawa | G01N 27/4072 |
| | | | | 204/424 |
| 2010/0170795 | A1 | 7/2010 | Cowburn et al. | |
| 2010/0252455 | A1 | 10/2010 | Pratt et al. | |

FOREIGN PATENT DOCUMENTS

| | | | |
|---|---|---|---|
| CN | 102636542 | A | 8/2012 |
| CN | 102778490 | A | 11/2012 |
| CN | 10598083 | A | 9/2016 |
| EP | 2214008 | A2 | 8/2010 |
| EP | 3105575 | A1 | 12/2016 |
| WO | 2015123176 | A1 | 8/2015 |

OTHER PUBLICATIONS

PCT Application No. PCT/US2015/015140, Written Opinion of the International Searching Authority, dated May 6, 2015, 7 pages.
PCT Application No. PCT/US2015/015140, International Preliminary Report on Patentability, dated Aug. 16, 2016, 8 pages.
English translation of Notifiation to Grant received for CN Application No. 2015800084796, dated Nov. 5, 2018, 2 pages.
English translation of Office Action received for CN Application No. 201580008479.6, dated May 2, 2018, 6 pages.
Notification to Grant received for CN Application No. 201580008479.6, dated Nov. 5, 2018, 1 page.
Office Action received for CN Application No. 201580008479.6, dated May 2, 2018, 6 pages.
Office Action received for European Application No. 15707830.4, dated May 17, 2019, 3 pages.
Search Report for CN Application No. 201580008479.6, dated Apr. 23, 2018, 1 page.

* cited by examiner

GAS SENSORS WITH STRUCTURE TO RESIST SIGNAL LOSSES DUE TO CONDENSATION

CROSS-REFERENCE TO RELATED APPLICATIONS

This application is the national stage application of and claims priority to International Application No. PCT/US2015/015140, filed on Feb. 10, 2015, and entitled "GAS SENSORS WITH STRUCTURE TO RESIST SIGNAL LOSSES DUE TO CONDENSATION", which claims priority to U.S. Provisional Patent Application Ser. No. 61/938,937 (entitled GAS SENSORS WITH STRUCTURE TO RESIST SIGNAL LOSSES DUE TO CONDENSATION filed Feb. 12, 2014), both of which are incorporated herein by reference in their entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

For electrochemical oxygen sensors used to measure concentrations around ambient levels, it may be necessary to greatly restrict the ingress of oxygen into the sensor in order to ensure that kinetic effects within the cell do not dominate the behavior. This often requires the use of highly restrictive, relatively long, narrow diameter gas capillaries, that may easily become blocked with condensate. When this occurs, the output signal from the sensor can be compromised, either completely dropping to zero, or being greatly attenuated.

Capillary controlled oxygen sensors are known to suffer from a number of further drawbacks. For example, pressure transient effects can occur should the sensor be subjected to rapid changes in external pressure. To address this important issue, it is usual to include within the design a feature which is not diffusion limiting in steady state conditions (the capillary remains the diffusion limiting factor) but which presents a high resistance to forced bulk flow. This component is commonly known as a bulk flow membrane. In addition it is possible that the performance of sensors when used in "dirty" environments such as flue exhausts can be degraded due to poisoning of the catalyst. The problem of condensation is a particular issue for oxygen cells that are used in such emissions applications.

SUMMARY

Aspects of the disclosure may include embodiments of a top cap assembly for use with a capillary controlled gas sensor comprising a top cap operable to be fitted into a recess in the sensor; a capillary located within the top cap; a bulk flow control assembly comprising a bulk flow membrane; a bulk flow control disk located on top of the bulk flow membrane; and a layer of adhesive attaching the bulk flow membrane and the bulk flow control disk, wherein the bulk flow control assembly may control gas flow into a capillary in the top cap; a raised boss operable to attach to the bulk flow control assembly, wherein the raised boss comprises a first capillary well at the top of the capillary; and a moat surrounding the raised boss, wherein the moat is operable to collect condensation formed on or around the bulk flow control assembly.

In some embodiments, the bulk flow control assembly may be attached to the raised boss with an adhesive ring. In some embodiments, the adhesive ring may comprise an opening allowing gas flow access to the first capillary well and capillary, and the opening of the adhesive ring may surround the first capillary well. In some embodiments, the top cap may comprise a second capillary well at the base of the capillary, wherein the second capillary well directs gas flow into a gas diffuser and sensing electrode. In some embodiments, the gas diffuser may be attached to the top cap with an adhesive ring, and the sensing electrode may be heat-sealed onto the top cap. In some embodiments, the bulk flow membrane may comprise a hydrophobic material, preventing condensation from blocking gas flow into the bulk flow membrane. In some embodiments, the top cap may be secured to the sensor by ultrasonic welding. In some embodiments, the top cap assembly may comprise a circular shape, and the bulk flow control assembly may comprise a circular shape. In some embodiments, the bulk flow control disk comprises approximately the same diameter as the bulk flow membrane. In some embodiments, the gas flows through the bulk flow membrane via the vertical edge of the bulk flow membrane.

Additional aspects of the disclosure may include embodiments of a top cap assembly for use with a capillary controlled gas sensor comprising a top cap operable to be fitted into a recess in the sensor; a capillary located within the top cap; a bulk flow control assembly comprising a bulk flow membrane comprising a hydrophobic material; a bulk flow control disk located on top of the bulk flow membrane; and a layer of adhesive attaching the bulk flow membrane and the bulk flow control disk, wherein the bulk flow control assembly may control gas flow into a capillary in the top cap; a raised boss operable to attach to the bulk flow control assembly, wherein the raised boss may comprise a first capillary well at the top of the capillary; a moat surrounding the raised boss, wherein the moat may be operable to collect condensation formed on or around the bulk flow control assembly; an adhesive ring attaching the bulk flow control assembly to the raised boss, wherein the adhesive ring may comprise an opening allowing gas flow access to the first capillary well and capillary, wherein the opening of the adhesive ring may surround the first capillary well, wherein the top cap may comprise a second capillary well at the base of the capillary, and wherein the second capillary well may direct gas flow into a gas diffuser and a sensing electrode.

In some embodiments, the bulk flow control disk comprises approximately the same diameter as the bulk flow membrane, and wherein the gas flows through the bulk flow membrane via the vertical edge of the bulk flow membrane. In some embodiments, the gas flows laterally through the bulk flow membrane toward the opening in the adhesive ring, wherein the gas flows from the bulk flow membrane into the first capillary well, wherein the first capillary well directs the gas flow into the capillary, wherein the gas flows through the capillary to the second capillary well, wherein second capillary well diffuses the gas flow into the gas diffuser, wherein the gas flow may be diffused further by the gas diffuser, wherein the gas diffuser may allow the gas to contact the sensing electrode, and wherein the gas may be diffused by the gas diffuser to cover a larger surface area of the sensing electrode. In some embodiments, the bulk flow membrane may comprise a low density, gas permeable material, such as Polytetrafluoroethylene (PTFE). In some embodiments, the gas diffuser may be attached to the top cap with an adhesive ring, and wherein the sensing electrode is heat-sealed onto the top cap.

Other aspects of the disclosure may include embodiments of a method for forming a gas sensor comprising a top cap assembly comprising assembling a gas sensor that is filled with electrolyte; forming a top cap comprising a capillary through the center, a moat on the top of the top cap, and a raised boss in the middle of the moat; placing an adhesive ring on the raised boss of the top cap, wherein the adhesive ring comprises an opening that surrounds the capillary; attaching a bulk flow membrane to the adhesive ring; and attaching a bulk flow control disk to the bulk flow membrane with a layer of adhesive between the bulk flow control disk and the bulk flow membrane.

In some embodiments, the method further comprises attaching a dust membrane over the top cap and bulk flow control disk. In some embodiments, the method further comprises attaching a gas diffuser to the bottom of the top cap, at the base of the capillary; and attaching a sensing element to the top cap below the gas diffuser. In some embodiments, the method further comprises determining the diameter of the bulk flow control disk with respect to the diameter of the bulk flow membrane to control the gas flow through the bulk flow membrane. In some embodiments, the bulk flow control disk may comprise approximately the same diameter as the bulk flow membrane, and therefore may only allow gas flow through a vertical edge of the bulk flow membrane.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
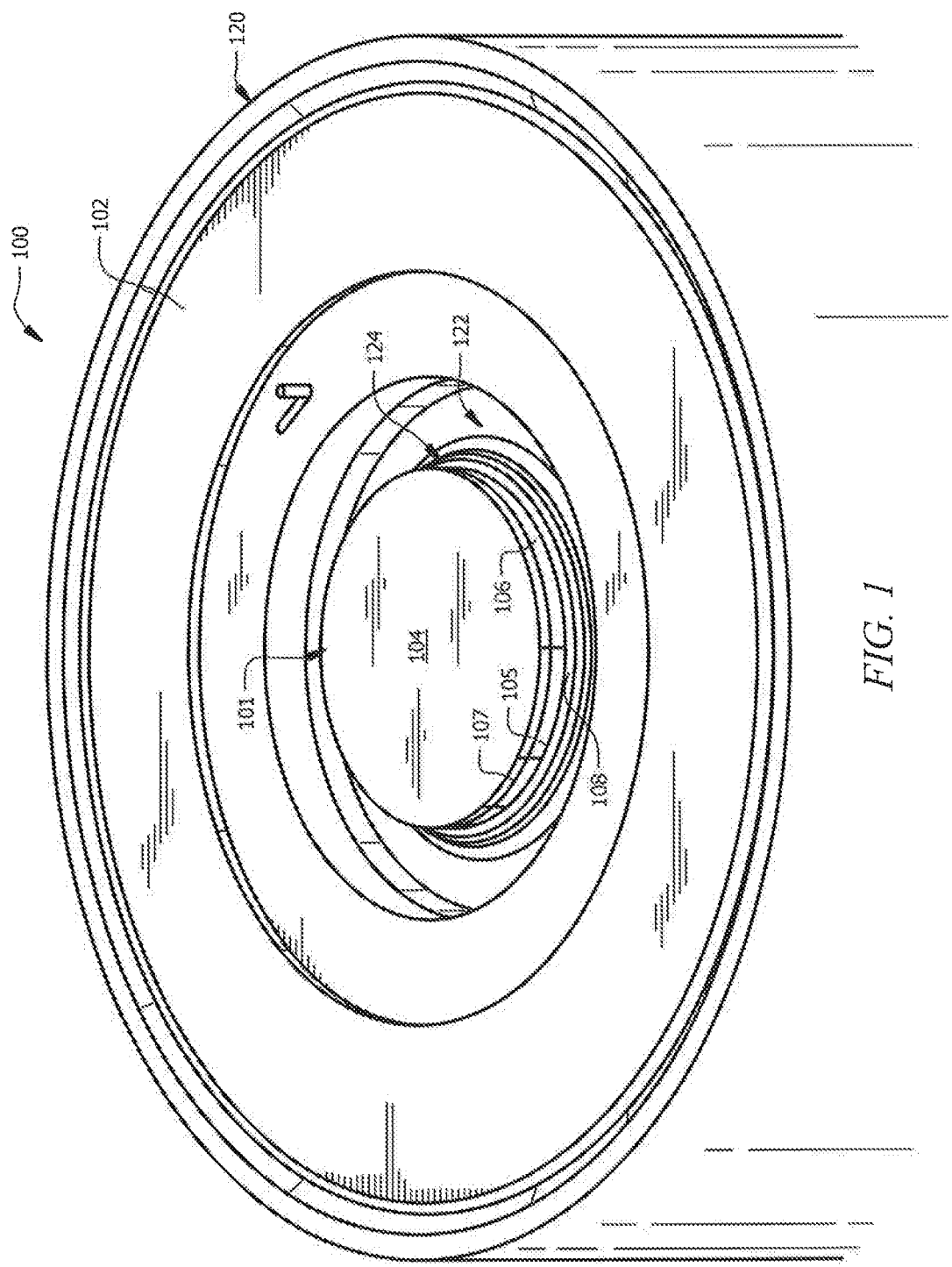
FIG. 1 illustrates an exemplary embodiment of a gas sensor comprising a top cap assembly.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The following brief definition of terms shall apply throughout the application:

The term "comprising" means including but not limited to, and should be interpreted in the manner it is typically used in the patent context;

The phrases "in one embodiment," "according to one embodiment," and the like generally mean that the particular feature, structure, or characteristic following the phrase may be included in at least one embodiment of the present invention, and may be included in more than one embodiment of the present invention (importantly, such phrases do not necessarily refer to the same embodiment);

If the specification describes something as "exemplary" or an "example," it should be understood that refers to a non-exclusive example;

The terms "about" or approximately" or the like, when used with a number, may mean that specific number, or alternatively, a range in proximity to the specific number, as understood by persons of skill in the art field; and If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

Embodiments of the disclosure relate to capillary controlled gas sensors comprising a top cap assembly, wherein the top cap assembly is operable to reduce the effects of condensation and pressure changes on the effectiveness of the gas sensor. The top cap assembly comprises a capillary controlled gas flow path, a bulk flow control assembly, and a raised boss surrounded by a moat. Despite the known drawbacks of capillary controlled gas sensors, they are frequently preferred for many applications since the cell output is directly related to gas concentration. Therefore, minimizing the impact of condensation on the performance of narrow capillary diffusion barriers remains a significant challenge.

Gas sensors are occasionally exposed to conditions where a combination of changes in temperature and high humidity can cause condensation to form. Electrochemical gas sensors traditionally use a diffusion restriction to control ingress of the target species into the cell. A potential sensor failure mode is blocking of this access route by condensation.

Embodiments disclosed herein address this issue with a design that is tolerant to these condensing conditions, enabling the sensor to continue giving a signal output in response to gas flow to the sensor. This is particularly important in the emissions market, where oxygen sensors are regularly used in flue gas analyzers, where heat and condensate are inevitably present.

Embodiments relate to the prevention of blocking of narrow capillaries by eliminating direct gas access to the diffusion controlling capillary inlet. Instead, the capillary inlet may be covered with a non-diffusion-controlling element. This element may present a significantly higher surface area for gas access than the capillary opening, which may provide an immediate geometric benefit. In addition, the shape of the non-diffusion-controlling element may be designed to minimize the risk of blocking by condensation.

Referring now to FIG. 1, an embodiment of a top cap assembly 100 installed on a gas sensor 120 is shown. The gas sensor 120 may be a capillary controlled gas sensor. The top cap assembly 100 may comprise a top cap 102 which may comprise a plastic material and may be fitted into a recess in the sensor 120 body. In some embodiments, the top cap 102 may be secured to the sensor 120 by ultrasonic welding. In some embodiments, the top cap assembly 100 may comprise a circular shape. In some embodiments, the top cap assembly 100 may comprise a bulk flow control assembly 101, wherein the bulk flow control assembly 101 may comprise a bulk flow membrane 106, a bulk flow control disk 104, and a layer of adhesive 107 attaching the bulk flow membrane 106 and the bulk flow control disk 104, and wherein the bulk flow control assembly 101 may comprise a circular shape. The bulk flow membrane 106 may comprise a non-diffusion controlling oversized porous disk. The bulk flow control assembly 101 may control gas flow into a capillary (not shown) in the top cap 102. In some embodiments, the gas may flow through the bulk flow membrane 106 via the vertical edge 105 of the bulk flow membrane 106.

In some embodiments, the top cap assembly 100 may comprise one or more means for preventing gas flow blockage issues caused by condensation. For example, the top cap 102 may comprise a moat 122 surrounding a raised boss 124, wherein the bulk flow control assembly 101 may be attached to the raised boss 124. In some embodiments, the bulk flow control assembly 101 may be attached to the raised boss 124 with an adhesive ring 108. The adhesive ring may also be known as a condensation prevention (CP) element. The CP element may remain chemically unaffected by any environmental gas or volatile organic vapor likely to be encountered in the intended applications of the gas sensor 120. The raised boss 124 may comprise an opening to the capillary (not shown) approximately in the center of the raised boss 124, wherein the raised boss 124 may be concentric with the capillary hole. The moat 122 may be operable to collect any condensation that may form on or around the bulk flow control assembly 101 and/or the raised boss 124. In other words, when condensation forms on or around the bulk flow control assembly 101, at least some of the condensation may flow down into the moat 122, preventing blockage of gas flow into the bulk flow membrane 106 by the condensation. In some embodiments, the bulk flow membrane 106 may comprise a hydrophobic material, further preventing condensation from blocking gas flow into the bulk flow membrane. Additionally, the gas flow may enter the bulk flow membrane 106 at the vertical edge 105, wherein the gas may flow through the vertical edge 105 at any point around the circumference of the bulk flow membrane 106. Therefore, even if a portion of the vertical edge 105 of the bulk flow membrane 106 is affected by condensation, the gas sensor may not be affected because the gas may flow through the rest of the unaffected circumference of the bulk flow membrane 106.

Figure 2:
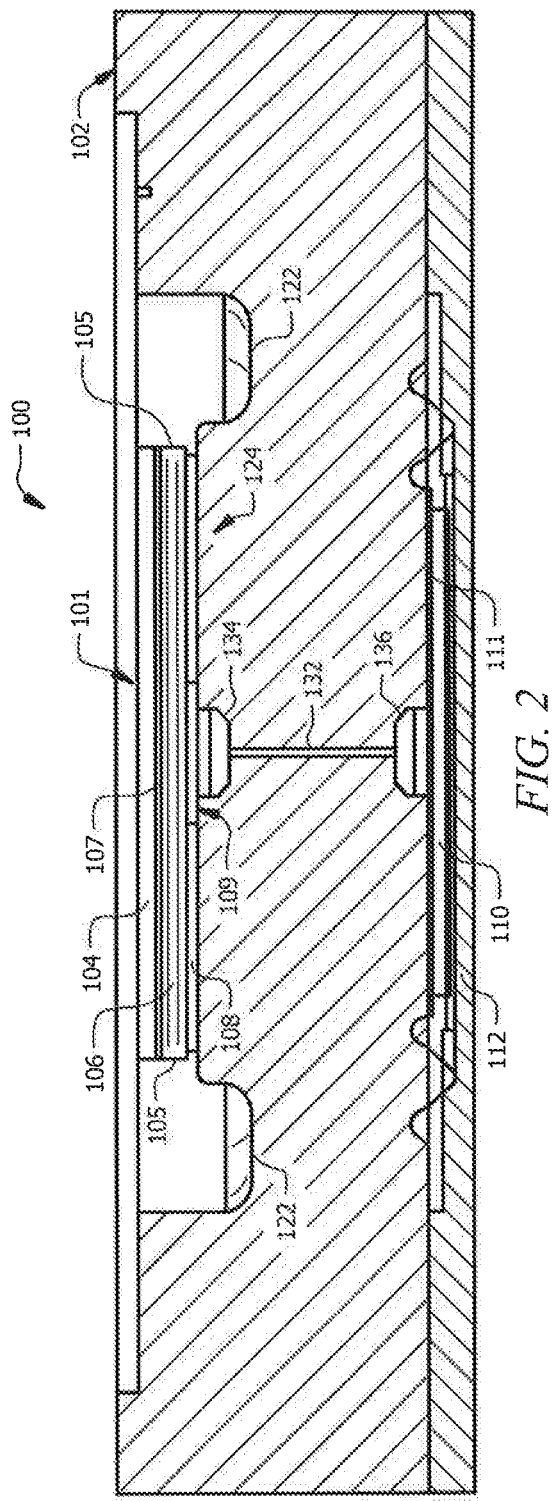
FIG. 2 illustrates a cross-sectional view of an exemplary embodiment of a gas sensor comprising a top cap assembly.

Referring now to FIG. 2, a cross-sectional view of the top cap assembly 100 is shown. The top cap 102 may comprise a capillary 132 located in approximately the center of the top cap 102. As described above, the raised boss 124 may comprise an opening to the capillary 132, or first capillary well 134, at the top (or entrance) of the capillary 132. The adhesive ring 108 attaching the bulk flow control assembly 101 to the raised boss 124, may comprise an opening 109 allowing gas flow access to the first capillary well 134 and capillary 132. The opening 109 of the adhesive ring 108 may surround the first capillary well 134.

In some embodiments, the top cap 102 may also comprise a second capillary well 136 at the base (or exit) of the capillary 132. The second capillary well 136 may direct gas flow into a gas diffuser 110 and sensing electrode 112. In some embodiments, the gas diffuser 110 may be attached to the top cap 102 with an adhesive ring 111. In some embodiments, the sensing electrode 112 may be heat-sealed onto the top cap 102.

In some embodiments, the top cap 102 may be approximately 20 millimeters (mm) in diameter. In other embodiments, the top cap 102 may be approximately 18.5 mm in diameter. In some embodiments, the capillary 132 may be approximately 30 to 60 micrometers (µm) in diameter. In some embodiments, the bulk flow membrane 106 may be approximately 6.0 mm in diameter. In some embodiments, the bulk flow control disk 104 may be approximately 6.0 mm in diameter.

Figure 3:
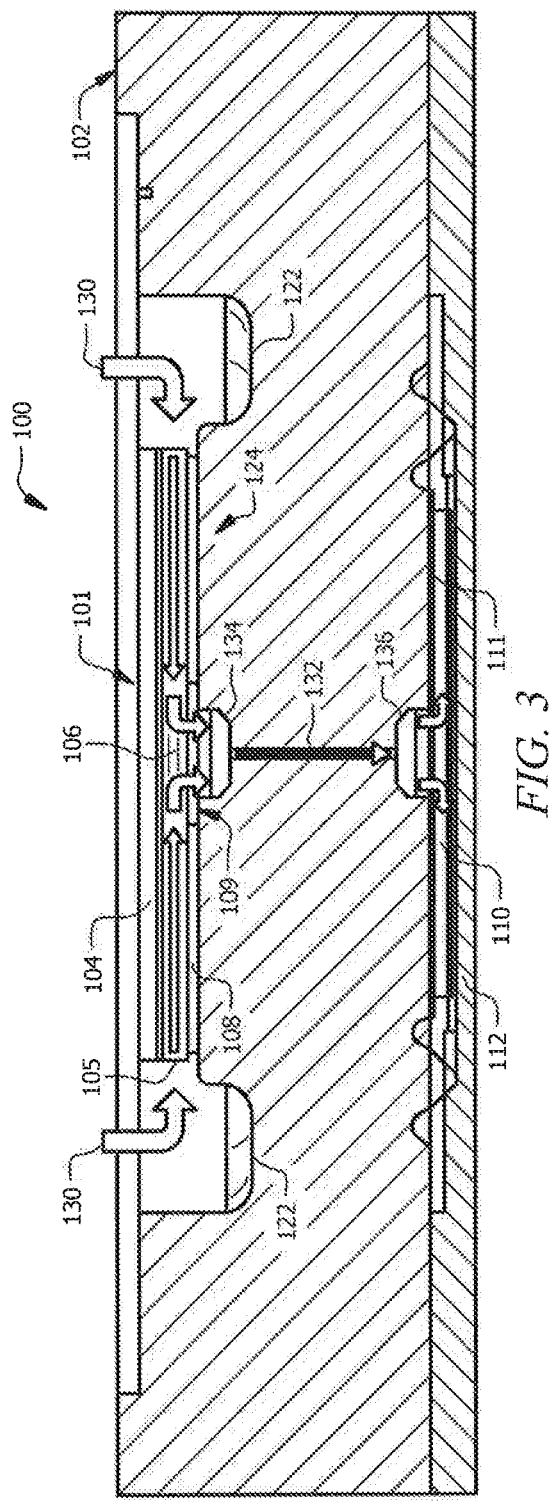
FIG. 3 illustrates another cross-sectional view of an exemplary embodiment of a gas sensor comprising a top cap assembly.

Referring now to FIG. 3, the gas flow through the top cap assembly 100 is illustrated, wherein the gas flow path is illustrated by arrows 130. The gas may flow into the bulk flow membrane 106 at the vertical edge 105 and then travel laterally through the bulk flow membrane 106 toward the center and the opening 109 in the adhesive ring 108. The gas may flow from the bulk flow membrane 106 into the first capillary well 134. The first capillary well 134 may direct the gas flow into the capillary 132, wherein the gas may flow through the capillary 132 to the second capillary well 136. The second capillary well 136 may allow the gas flow to diffuse, wherein the second capillary well 136 may comprise a significantly larger diameter than the capillary 132. The second capillary well 136 may also direct the gas flow into the gas diffuser 110, wherein the gas flow may be diffused further by the gas diffuser 110. The gas diffuser 110 may allow the gas to contact the sensing electrode 112, wherein the gas may be diffused by the gas diffuser 110 to cover a larger surface area of the sensing electrode 112.

The bulk flow control assembly 101 may be operable to control the flow rate of the gas into the capillary 132. The material properties of the bulk flow membrane 106 may affect the gas flow rate through the bulk flow membrane 106. In some embodiments, the bulk flow membrane 106 may comprise a low density, gas permeable material, such as PTFE. Additionally, the size of the bulk flow control disk 104 may affect the gas flow rate through the bulk flow membrane 106. The bulk flow control disk 104 may comprise a gas impermeable material, such as a plastic material. The size of the bulk flow control disk 104 may determine the surface area of the bulk flow membrane 104 that may be available to contact the ambient air, and therefore the amount of gas that may be able to flow through the bulk flow membrane 106. In the embodiment shown in FIG. 3, the bulk flow control disk 104 may have approximately the same diameter as the bulk flow membrane 106, and may therefore only allow the vertical edge 105 of the bulk flow membrane to contact the ambient air. Therefore, the gas flow may enter the bulk flow membrane 106 only at the vertical edge 105. In other embodiments, the size of the bulk flow control disk 104 may be smaller, to allow for a higher gas flow rate through the bulk flow membrane 106. The size of the bulk flow control disk 104 may be varied based on the application and environment of use for the gas sensor 120 (not shown). Additionally, the size of the bulk flow control disk 104 may be tuned to limit bulk gas flow, while also providing adequate surface area of the bulk flow membrane to prevent the effects of condensation.

Alternatively, the masking or tuning of a highly porous Condensation Prevention (CP) component can be achieved by coating parts of the surface of the component with a layer having reduced gas transmission characteristics. In particular, layers facilitating oxygen transport to a greater extent than moisture are favored. Examples are Parylene, polymers that are substantially fluorinated (polyfluorosiloxanes, PVDF) or oleophobic treatments. In such cases, the ability of the CP component to accept a suitable coating substrate is critical. Alternatively, a highly porous CP component which would otherwise be unsuitable could be densified or compressed across all or part of its surface to provide the required compromise in properties. Alternatively, the dual requirements of providing increased surface area and controlling bulk flow can be met by selecting a material which has lower porosity but high bulk flow resistance without introducing significant diffusion control in normal operation.

As an alternate embodiment to prevent condensation in oxygen sensors, a solid PTFE membrane can be employed instead of the porous material described previously as the CP element. Solid PTFE has the property of allowing the passage of oxygen by a process of solid solution and permeation (rather than gas phase diffusion) but which will again prevent external water droplets from blocking the capillary can be used. Again, the design intent is that the capillary, and not the CP element, is the gas limiting access (i.e. controls the sensor current).

The use of a solid membrane method is specifically applicable to oxygen sensors, since there are few (if any) materials which offer the specific solid solution process for other gases. However, this is worthy of specific mention since oxygen sensors tend to have the smallest capillary accesses (due to the high ambient concentrations) and so suffer from condensation problems to a much greater extent than sensors for toxic gases, for example. The porous PTFE approach can be used for a wider variety of gas species.

The solid membrane barrier must be permeable to oxygen. In addition it is important that the membrane material does not readily allow the passage of water vapor or volatile organic species. A number of types of material meet this requirement. In the simplest implementation a thin solid PTFE film is a suitable barrier. This readily allows passage of oxygen, but not moisture.

In some embodiments, a combination of both capillary and solid membrane can be used as barriers. However, the oxygen permeability of the solid membrane material is chosen such that the cell current is controlled by the capillary and therefore the solid membrane is employed as a barrier to primarily prevent bulk flow of oxygen when the cell is subjected to pressure changes, prevent ingress of contamination to the electrode and to prevent external condensation from blocking the capillary.

Figure 4:
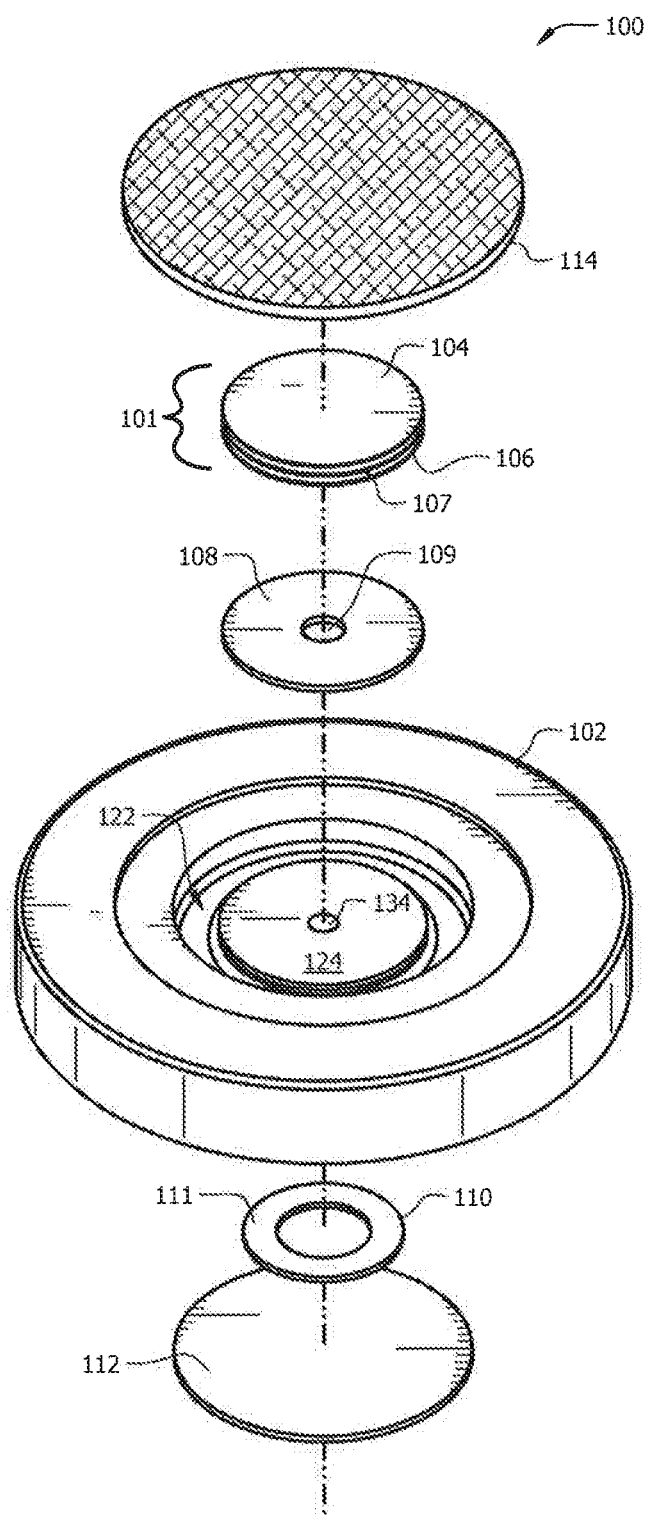
FIG. 4 illustrates an exploded view of an exemplary embodiment of a top cap assembly.

Referring now to FIG. 4, an exploded view of the top cap assembly 100, as described in FIGS. 1-3, is shown. In the embodiment shown in FIG. 4, the top cap assembly may optionally comprise a dust membrane 114 fitted over the bulk flow control assembly 101 onto the top cap 102, wherein the dust membrane 114 may protect the elements of the top cap assembly 100 from dust and other foreign objects which may damage the top cap assembly 100 and/or disrupt gas flow through the top cap assembly 100. The dust membrane 114 may comprise a porous material that does not affect the gas flow rate from the ambient air into the top cap assembly 100.

Figure 5:
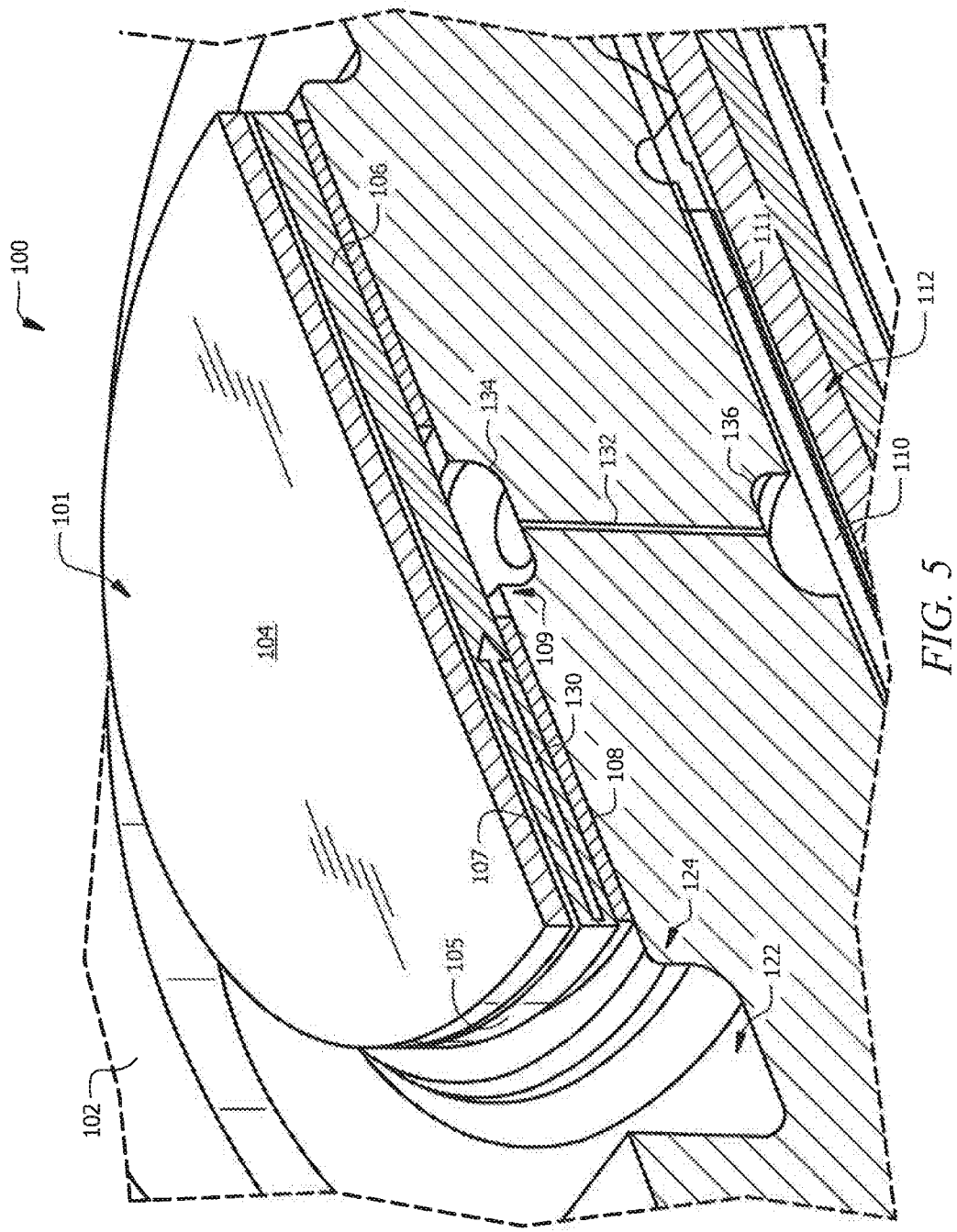
FIG. 5 illustrates an orthogonal, cross-sectional view an exemplary embodiment of a gas sensor.

Referring now to FIG. 5, an orthogonal, cross-section view of the top cap assembly 100 described above is shown. FIG. 5 illustrates another detailed view of the elements described in FIGS. 1-4.

Figure 6:
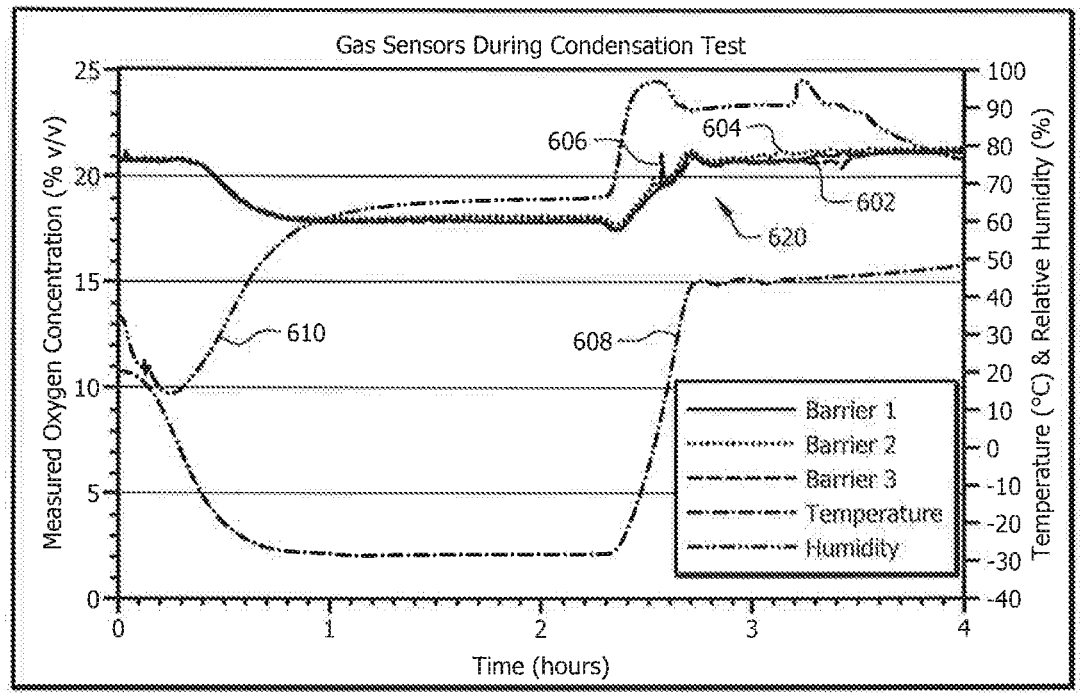
FIG. 6 is a graph illustrating the results of testing the effects of condensation on a gas sensor that comprises a top cap assembly.

Referring now to FIG. 6, a graph is shown illustrating the results of testing the effects of condensation on a gas sensor that comprises a top cap assembly 100 (as described above). In the embodiments shown in FIG. 6, the measurement of oxygen concentration, in units of percent oxygen volume per total volume (% v/V), from three sensors 602, 604, and 606 was measured with time, wherein all comprising a top cap assembly. The oxygen concentration for each sensors was measured as the temperature 608 and humidity 610 were changed, wherein changes of temperature and humidity stimulate condensation formation. As can be seen in FIG. 6, at the point 620 on the graph where the temperature 608 and humidity 610 changes would stimulate condensation, the oxygen concentration measured by the three sensors 602, 604, and 606 remains relatively stable. This result illustrates that a gas sensor comprising the top cap assembly described above would effectively resist the adverse effects of condensation formation.

Figure 7:
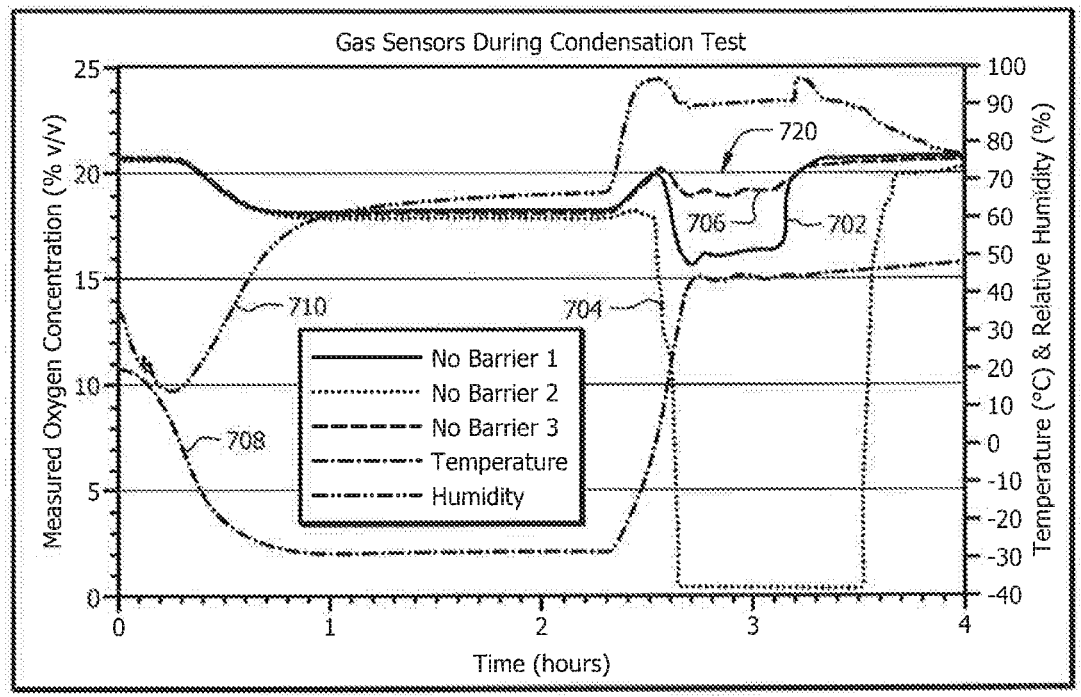
FIG. 7 is a graph illustrating the results of testing the effects of condensation on a gas sensor that does not comprise a top cap assembly.

Alternatively, FIG. 7 illustrates the results of testing the effects of condensation on a gas sensor that does not comprise a top cap assembly. In the embodiments shown in FIG. 7, the measure oxygen concentration from three sensors 702, 704, and 706 was measured with time as the temperature 708 and humidity 710 were changed, wherein changes of temperature and humidity stimulate condensation formation. At the point 720 on the graph where the temperature 708 and humidity 710 changes would stimulate condensation, the oxygen concentration measured by each of the three sensors 702, 704, and 706 is adversely affected, showing lower oxygen concentrations in all three sensors, with one sensor 704 dropping to zero. In other words, oxygen readings of the three sensors are either attenuated or lost completely when condensation is formed on the gas sensor. This is caused by the condensation interrupting gas flow to the sensor.

Figure 8:
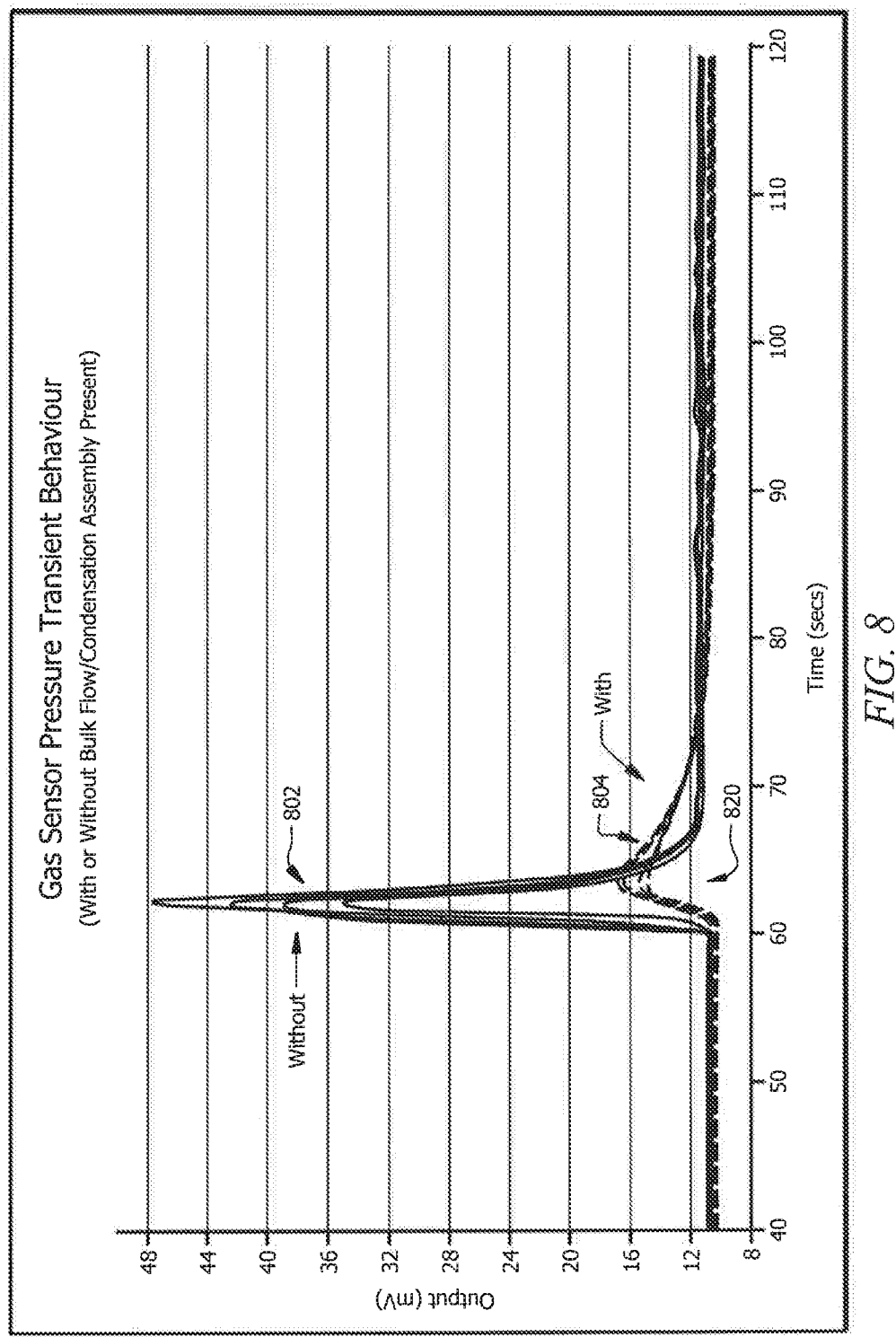
FIG. 8 is a graph illustrating the effects of pressure changes on a gas sensor.

Referring now to FIG. 8, a graph illustrating the effects of pressure changes on a gas sensor is shown. FIG. 8 illustrates the changes in electrical output, which may be related to gas flow in the sensor, in a gas sensor over time with changes in pressure. Several sensors were tested with a top cap assembly (as described above) installed on the sensor, and the same sensors were also tested without the top cap assembly. The results of the sensors tested without a top cap assembly are shown in solid lines 802, and the results of the sensors tested with a top cap assembly are shown in dashed lines 804. As can be seen in the graph, at the point 820 when the pressure was changed (increased), at approximately 62 seconds, the output for the sensors without a top cap assembly 802 increases significantly, from approximately 10 millivolts (mV) to approximately 48 mV. However, the output flow rate for the sensors with a top cap assembly 804 increases only slightly, from approximately 10 mV to approximately 16 mV. This illustrates that the sensors comprising a top cap assembly are more stable when the pressure changes than sensors without a top cap assembly.

Embodiments of the disclosure may relate to methods of forming or manufacturing a top cap assembly, or a gas sensor comprising a top cap assembly. A method may comprise assembling a gas sensor that is filled with electrolyte; forming a top cap comprising a capillary through the center, a moat on the top of the top cap, and a raised boss in the middle of the moat; placing an adhesive ring on the raised boss of the top cap, wherein the adhesive ring comprises an opening that surrounds the capillary; attaching a bulk flow membrane to the adhesive ring; and attaching a bulk flow control disk to the bulk flow membrane with a layer of adhesive between the bulk flow control disk and the bulk flow membrane.

In some embodiments, the method may further comprise attaching a dust membrane over the top cap and bulk flow control disk. In some embodiments, the method may further comprise attaching a gas diffuser to the bottom of the top cap, at the base of the capillary; and attaching a sensing element to the top cap below the gas diffuser. In some embodiments, the method may further comprise determining the diameter of the bulk flow control disk with respect to the diameter of the bulk flow membrane to control the gas flow through the bulk flow membrane. In some embodiments, the bulk flow control disk may comprise approximately the same diameter as the bulk flow membrane, and therefore may only allow gas flow through a vertical edge of the bulk flow membrane.

While various embodiments in accordance with the principles disclosed herein have been shown and described above, modifications thereof may be made by one skilled in the art without departing from the spirit and the teachings of the disclosure. The embodiments described herein are representative only and are not intended to be limiting. Many variations, combinations, and modifications are possible and are within the scope of the disclosure. Alternative embodiments that result from combining, integrating, and/or omitting features of the embodiment(s) are also within the scope of the disclosure. Accordingly, the scope of protection is not limited by the description set out above, but is defined by the claims which follow, that scope including all equivalents of the subject matter of the claims. Each and every claim is incorporated as further disclosure into the specification and the claims are embodiment(s) of the present invention(s). Furthermore, any advantages and features described above may relate to specific embodiments, but shall not limit the application of such issued claims to processes and structures accomplishing any or all of the above advantages or having any or all of the above features.

Additionally, the section headings used herein are provided for consistency with the suggestions under 37 C.F.R. 1.77 or to otherwise provide organizational cues. These headings shall not limit or characterize the invention(s) set out in any claims that may issue from this disclosure. Specifically and by way of example, although the headings might refer to a "Field," the claims should not be limited by the language chosen under this heading to describe the so-called field. Further, a description of a technology in the "Background" is not to be construed as an admission that certain technology is prior art to any invention(s) in this disclosure. Neither is the "Summary" to be considered as a limiting characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of the claims shall be considered on their own merits in light of this disclosure, but should not be constrained by the headings set forth herein.

Use of broader terms such as comprises, includes, and having should be understood to provide support for narrower terms such as consisting of, consisting essentially of, and comprised substantially of. Use of the term "optionally," "may," "might," "possibly," and the like with respect to any element of an embodiment means that the element is not required, or alternatively, the element is required, both alternatives being within the scope of the embodiment(s). Also, references to examples are merely provided for illustrative purposes, and are not intended to be exclusive.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A top cap assembly for use with a capillary controlled gas sensor comprising:
   a top cap operable to be fitted into a recess in the capillary controlled gas sensor;
   a capillary located within the top cap;
   a bulk flow control assembly comprising:
      a bulk flow membrane;
      a bulk flow control disk located on top of the bulk flow membrane; and
      a layer of adhesive attaching the bulk flow membrane and the bulk flow control disk, wherein the bulk flow control assembly is configured to control gas flow into the capillary in the top cap;
   a raised boss attached to the bulk flow control assembly, wherein the raised boss comprises a first capillary well at the top of the capillary; and
   a trench surrounding the raised boss, wherein the trench is operable to collect condensation formed on or around the bulk flow control assembly,
   wherein the bulk flow control disk comprises a gas impermeable material to confine the gas flow laterally into the bulk flow membrane via a vertical edge of the bulk flow membrane, and wherein the vertical edge is defined by a circumferential surface of the bulk flow membrane along a height of the bulk flow membrane.

2. The assembly of claim 1, wherein the bulk flow control assembly is attached to the raised boss with an adhesive ring.

3. The assembly of claim 2, wherein the adhesive ring comprises an opening allowing gas flow access to the first capillary well and capillary, and wherein the opening of the adhesive ring surrounds the first capillary well.

4. The assembly of claim 1, wherein the top cap comprises a second capillary well at a base of the capillary, wherein the second capillary well directs gas flow into a gas diffuser and sensing electrode.

5. The assembly of claim 4, wherein the gas diffuser is attached to the top cap with an adhesive ring, and wherein the sensing electrode is heat-sealed onto the top cap.

6. The assembly of claim 1, wherein the bulk flow membrane comprises a hydrophobic material, that prevents condensation from blocking the gas flow into the bulk flow membrane.

7. The assembly of claim 1, wherein the top cap is secured to the capillary controlled gas sensor by ultrasonic welding.

8. The assembly of claim 1, wherein the top cap assembly comprises a circular shape, and wherein the bulk flow control assembly comprises a circular shape.

9. The assembly of claim 8, wherein the bulk flow control disk comprises approximately the same diameter as the bulk flow membrane.

10. The assembly of claim 1, wherein the bulk flow membrane comprises a hydrophobic material, and the assembly further comprises an adhesive ring attaching the bulk flow control assembly to the raised boss, wherein the adhesive ring comprises an opening allowing gas flow access to the first capillary well and capillary, wherein the opening of the adhesive ring surrounds the first capillary well, wherein the top cap comprises a second capillary well at a base of the capillary, and wherein the second capillary well directs the gas flow into a gas diffuser and a sensing electrode.

11. The assembly of claim 10, wherein the bulk flow control disk comprises approximately a same diameter as the bulk flow membrane, and wherein the gas flows through the bulk flow membrane via the vertical edge of the bulk flow membrane.

12. The assembly of claim 11, wherein the gas flows laterally through the bulk flow membrane toward the opening in the adhesive ring, wherein the gas flows from the bulk flow membrane into the first capillary well, wherein the first capillary well directs the gas flow into the capillary, wherein the gas flows through the capillary to the second capillary well, wherein the second capillary well diffuses the gas flow into the gas diffuser, wherein the gas flow is diffused further by the gas diffuser, wherein the gas diffuser allows the gas to contact the sensing electrode, and wherein the gas is diffused by the gas diffuser to cover a larger surface area of the sensing electrode.

13. The assembly of claim 10, wherein the bulk flow membrane comprises a low density, gas permeable material.

14. The assembly of claim 10, wherein the gas diffuser is attached to the top cap with a second adhesive ring, and wherein the sensing electrode is heat-sealed onto the top cap.

15. A method for forming a gas sensor comprising a top cap assembly, the method comprising:
assembling a gas sensor that is filled with an electrolyte;
forming a top cap operable to be fitted into a recess in the gas sensor and comprising a capillary through the center of the top cap, a trench on a top of the top cap, and a raised boss in the middle of the trench;
placing an adhesive ring on the raised boss of the top cap, wherein the adhesive ring comprises an opening that surrounds the capillary;
attaching a bulk flow membrane to the adhesive ring; and
attaching a bulk flow control disk to the bulk flow membrane with a layer of adhesive between the bulk flow control disk and the bulk flow membrane to form a bulk flow control assembly that is configured to control a gas flow into the capillary in the top cap,
wherein the trench is configured to collect condensation formed on or around the bulk flow control assembly, and
wherein the bulk flow control disk comprises a gas impermeable material to confine the gas flow laterally into the bulk flow membrane via a vertical edge of the bulk flow membrane, and wherein the vertical edge is defined by a circumferential surface of the bulk flow membrane along a height of the bulk flow membrane.

16. The method of claim 15 further comprising attaching a dust membrane over the top cap and bulk flow control disk.

17. The method of claim 15 further comprising:
attaching a gas diffuser to a bottom of the top cap, at a base of the capillary; and
attaching a sensing element to the top cap below the gas diffuser.

18. The method of claim 15 further comprising determining a diameter of the bulk flow control disk with respect to a diameter of the bulk flow membrane to control the gas flow through the bulk flow membrane.

19. The method of claim 18, wherein the bulk flow control disk comprises approximately the same diameter as the bulk flow membrane, and therefore only allows gas flow through the vertical edge of the bulk flow membrane.

20. The assembly of claim 1, wherein the bulk flow membrane is configured to control the gas flow in the capillary.

21. A top cap assembly for use with a capillary controlled gas sensor comprising:
a top cap configured to be fitted into a recess in the capillary controlled gas sensor, the top cap having a raised boss, the top cap defining a capillary extending therethrough and a trench surrounding the raised boss where the raised boss defines a first capillary well at a top of the capillary; and
a bulk flow control assembly attached to the raised boss comprising:
a bulk flow membrane; and
a bulk flow control disk located on top of the bulk flow membrane; wherein the bulk flow control assembly is configured to control a gas flow into the capillary in the top cap, wherein the trench is configured to collect condensation formed on or around the bulk flow control assembly,
wherein the bulk flow control disk comprises a gas impermeable material to confine the gas flow laterally into the bulk flow membrane via a vertical edge of the bulk flow membrane, and wherein the vertical edge is defined by a circumferential surface of the bulk flow membrane along a height of the bulk flow membrane.

22. The assembly of claim 21, wherein the bulk flow control assembly is attached to the raised boss with an adhesive ring.

23. The assembly of claim 22, wherein the adhesive ring comprises an opening allowing gas flow access to the first capillary well and capillary, and wherein the opening of the adhesive ring surrounds the first capillary well.

24. The assembly of claim 21, wherein the top cap comprises a second capillary well at a base of the capillary, wherein the second capillary well directs gas flow into a gas diffuser and sensing electrode.

25. The assembly of claim 21, wherein the bulk flow membrane comprises a hydrophobic material, that prevents condensation from blocking the gas flow into the bulk flow membrane.

26. The assembly of claim 21, wherein the bulk flow control disk has a first outer diameter, and wherein the bulk flow membrane has a second outer diameter.

27. The assembly of claim 26, wherein the first outer diameter is substantially equivalent to the second outer diameter.

* * * * *